United States Patent
Ho et al.

(10) Patent No.: US 9,497,222 B2
(45) Date of Patent: Nov. 15, 2016

(54) IDENTIFICATION OF WEB FORM PARAMETERS FOR AN AUTHORIZATION ENGINE

(71) Applicant: International Business Machines Corporation, Armonk, NY (US)

(72) Inventors: Thuanan Ho, Round Rock, TX (US); Rahul Mishra, Austin, TX (US); Miguel Pedroza, Austin, TX (US); Ori Pomerantz, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 14/282,667

(22) Filed: May 20, 2014

(65) Prior Publication Data
US 2015/0341387 A1    Nov. 26, 2015

(51) Int. Cl.
H04L 29/06    (2006.01)

(52) U.S. Cl.
CPC .............. *H04L 63/20* (2013.01); *H04L 29/06* (2013.01); *H04L 63/08* (2013.01); *H04L 63/10* (2013.01); *H04L 63/168* (2013.01)

(58) Field of Classification Search
CPC ....... H04L 63/20; H04L 63/08; H04L 29/06; H04L 63/10; H04L 63/168
See application file for complete search history.

(56) References Cited

U.S. PATENT DOCUMENTS

| | | | | |
|---|---|---|---|---|
| 5,634,012 A * | 5/1997 | Stefik | ...................... | G06F 21/10 705/39 |
| 6,212,640 B1 * | 4/2001 | Abdelnur | ................ | H04L 29/06 726/2 |
| 6,311,278 B1 * | 10/2001 | Raanan | .................... | H04L 63/02 173/152 |
| 8,407,766 B1 * | 3/2013 | Newstadt | .............. | H04L 63/102 726/10 |
| 2002/0178175 A1 | 11/2002 | Li | | |
| 2003/0050919 A1 * | 3/2003 | Brown | ................ | G06F 21/6218 |
| 2003/0200442 A1 * | 10/2003 | Bhat | ....................... | H04L 67/02 713/182 |
| 2004/0059920 A1 * | 3/2004 | Godwin | .................. | G06F 21/55 713/183 |
| 2009/0288134 A1 * | 11/2009 | Foottit | .................. | G06F 21/105 726/1 |
| 2011/0202829 A1 | 8/2011 | Klassen et al. | | |

(Continued)

OTHER PUBLICATIONS

Buecker, "IBM Tivoli Security Policy Manager," Red paper, 2009, pp. 1-30.*

*Primary Examiner* — Jung Kim
*Assistant Examiner* — James J Wilcox
(74) *Attorney, Agent, or Firm* — Terrile, Cannatti, Chambers & Holland, LLP; Stephen A. Terrile

(57) ABSTRACT

A method, system and computer-usable medium are disclosed for automating the identification of web form parameters for an authorization engine. A web page containing a set of parameters is received and then processed to identify structured portions it may contain. A target structured portion is then selected and processed to identify a corresponding set of web form parameters. Once identified, the set of web form parameters are then processed to generate a policy with a corresponding set of policy rule parameters. Matching operations are then performed to respectively match individual parameters of the set of web form parameters to individual parameters of the set of policy rule parameters. The policy is then associated with its associated web page URL and the process is repeated, proceeding with selecting another target structured portion to process.

8 Claims, 4 Drawing Sheets

(56) References Cited

U.S. PATENT DOCUMENTS

| | | | | |
|---|---|---|---|---|
| 2011/0296496 | A1* | 12/2011 | O'Donnell | G06F 21/629 726/4 |
| 2012/0198558 | A1 | 8/2012 | Liu et al. | |
| 2013/0227639 | A1* | 8/2013 | Giambiagi | G06F 21/00 726/1 |
| 2013/0291055 | A1* | 10/2013 | Muppidi | H04L 63/20 726/1 |
| 2014/0157351 | A1* | 6/2014 | Canning | H04L 63/10 726/1 |
| 2014/0282831 | A1* | 9/2014 | Pedroza | H04L 63/10 726/1 |
| 2014/0337914 | A1* | 11/2014 | Canning | H04L 63/10 726/1 |
| 2014/0359691 | A1* | 12/2014 | Woods | H04L 63/20 726/1 |

* cited by examiner

IDENTIFICATION OF WEB FORM PARAMETERS FOR AN AUTHORIZATION ENGINE

BACKGROUND OF THE INVENTION

1. Field of the Invention

The present invention relates in general to the field of computers and similar technologies, and in particular to software utilized in this field. Still more particularly, it relates to a method, system and computer-usable medium for automating the identification of web form parameters for an authorization engine.

2. Description of the Related Art

Authorization, as it relates to information security, is generally defined as the function of specifying access rights to resources. More specifically, "to authorize" is to define an access policy to specify under what conditions, or within which parameters, access is authorized. The resulting access policy is then used to control access to a given resource. Accordingly, it has become common for access control in computer systems and networks to rely upon access policies to approve, or disapprove, access requests for resources.

One known approach to managing such authorizations is through the implementation of an authorization engine, such as the Tivoli® Security Policy Manager (TSPM), available from International Business Machines (IBM®) of Armonk, N.Y. Such authorization engines typically use parameters from a request as input to a policy decision point (PDP), which in turn references predetermined rules to decide whether a given request will be permitted or denied. However, these parameters first need to be available in some manner within a rule authoring interface. The process by which rule parameters are matched to request parameters is known as policy configuration. Currently, this process is non-automated and is performed manually.

SUMMARY OF THE INVENTION

A method, system and computer-usable medium are disclosed for automating the identification of web form parameters for an authorization engine. In various embodiments, automated web form parameter identification operations are initiated by receiving a web page containing a set of parameters. The web page is then processed to identify structured portions it may contain. In certain embodiments, the structured portion of the web page is a web form.

If one or more structured portions of the web page have been identified, then a target structured portion is selected, and then processed, to identify a corresponding set of web form parameters. Once identified, matching operations are performed to respectively match individual parameters of the set of web form parameters to individual parameters of a corresponding set of policy rule parameters. The matched sets of web form and policy rule parameters are then provided for authoring a policy. Once authored, the policy is then associated with its associated web page URL and the process is repeated, proceeding with selecting another structured portion to process.

The policy is then provided to a security policy management system (SPMS) for enforcement. In various embodiments, the policy is an access policy, which is used by the SPMS to determine whether to approve, or disapprove, access requests for predetermined resources. In certain embodiments, the SPMS includes an authorization engine. In one embodiment, the SPMS includes a rules editor configured to perform editing operations on the set of policy rule parameters.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
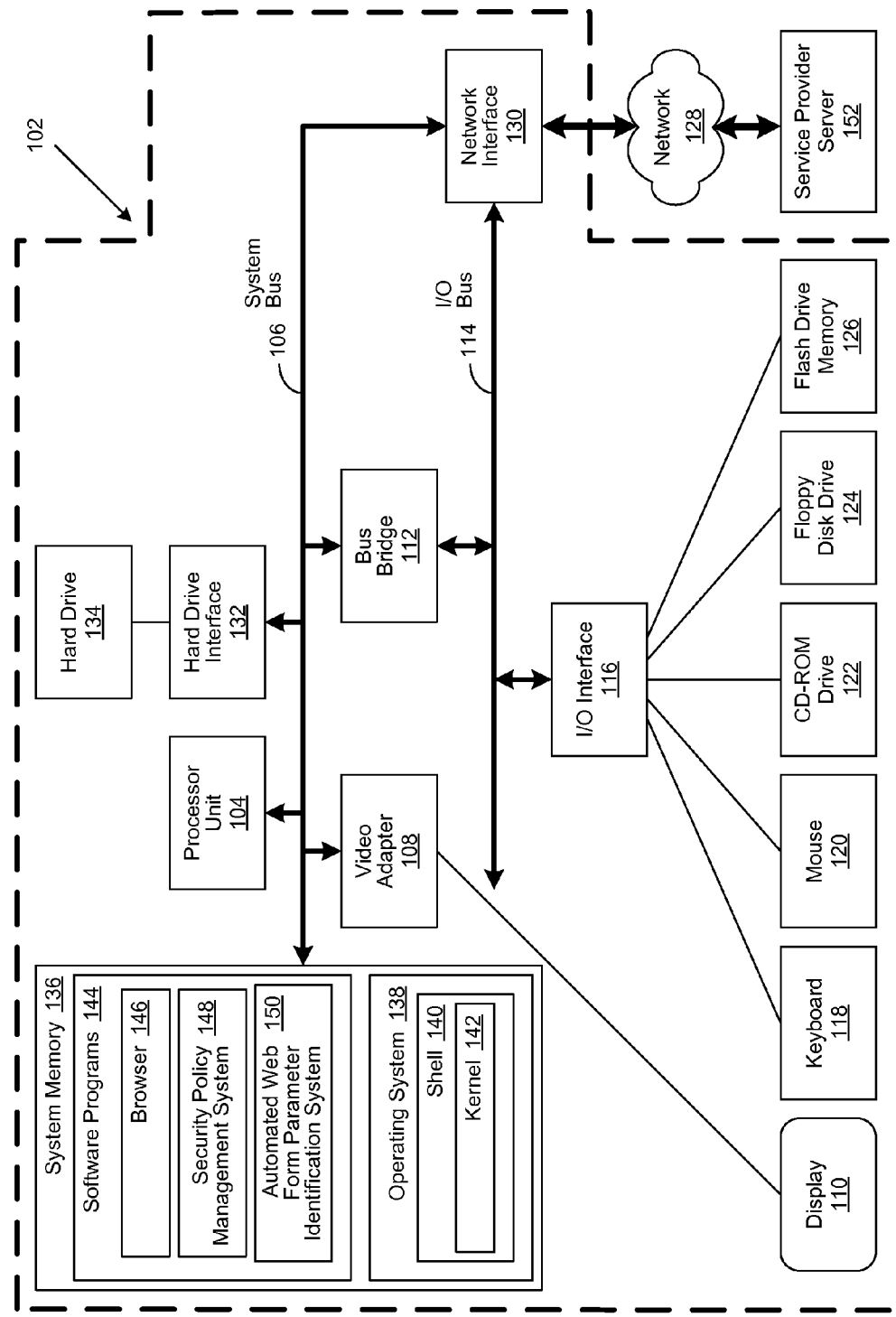
FIG. 1 depicts an exemplary client computer in which the present invention may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and a security policy management system 148, which is implemented for the management of security policies in various embodiments of the invention. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. In various embodiments, software programs 144 may also include an automated web form parameter identification system 150. In these and other embodiments, the automated web form parameter identification system 150 includes code for implementing the processes described hereinbelow. In one embodiment, client computer 102 is able to download the automated web form parameter identification system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
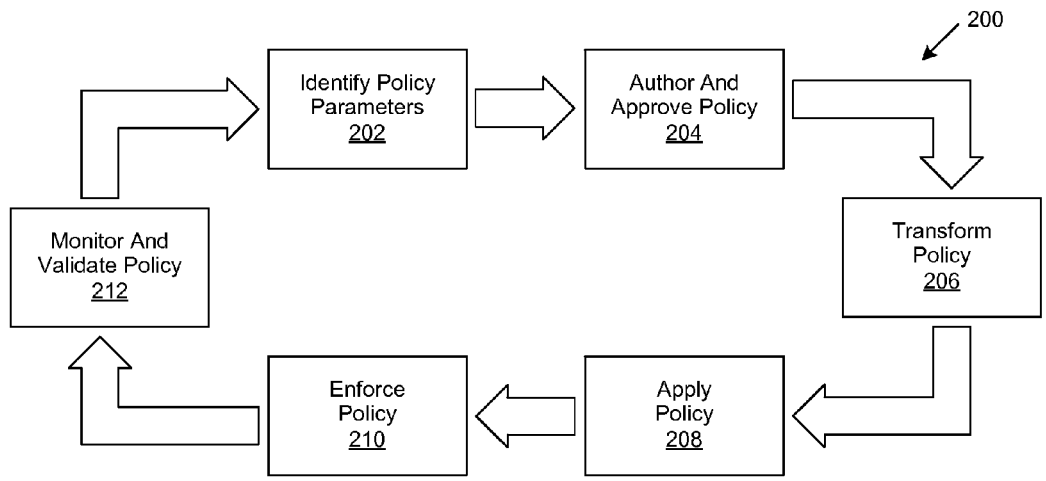
FIG. 2 is a simplified block diagram of a security policy management lifecycle.

FIG. 2 is a simplified block diagram of a security policy management lifecycle implemented in accordance with an embodiment of the invention. Skilled practitioners of the art will be aware that security is one aspect of policy and that various factors drive the need for improved management of security policy lifecycles within IT environments. For example, consistent implementation of security policies can assist in ensuring compliance, such as when a corporate policy is incorporated into code, a configuration, or an intermediation of some kind to provide access to a resource or deliver a service. Furthermore, addressing risks that are associated with deploying inconsistent policies is advisable, as inconsistent policy deployment can pose significant operational risk, further driving the desire for comprehensive security policy management. Moreover, better visibility into, and control of, security policies can assist in enabling effective operational governance. In various embodiments, such security policies may include access policies that are implemented to approve, or disapprove, access requests for resources.

In this embodiment, a security policy management life cycle 200 includes the identification of security policy parameters 202, the authoring and approval 204 of security policies (e.g., an access policy), which are then published and subsequently transformed 206 into a form that can be applied 208, such as at one or more policy decision points (PDPs). Once the security policy has been applied, it is then enforced 210. In various embodiments, the security policy is enforced at one or more policy enforcement points (PEPs). The security policy is thereafter monitored and validated 212 on an ongoing basis so that it can be adjusted as needed to better reflect business and technical drivers.

More specifically, the authoring and approval 204 phase of the security policy management life cycle 200 includes the identification, consolidation and authoring of individual security policy elements into a resulting security policy that can then be submitted for approval by a predetermined set of stakeholders. In various embodiments, the individual security policy elements may include individual access policy elements. Likewise, the transformation 206 phase of the security policy management life cycle 200 includes transforming an authored security policy into an actionable form. In certain embodiments, the transformation 206 phase may also include an assessment of a security policy's impact and the identification of associated metrics to refine best practices.

In this embodiment, the enforcement 210 phase of the security policy management life cycle 200 likewise includes the communication, propagation, implementation, and enforcement of the security policy. In various embodiments the enforcement of the security policy may be automated, manual, or a combination of both. Likewise, the monitoring and validation 212 phase of the security policy management life cycle 200 includes monitoring, measuring, analyzing and reporting security policy compliance and accuracy. In certain embodiments, as shown in FIG. 2, the results of the monitoring and validation 212 phase are provided as input to the identification of security policy parameters 202 phase during the lifecycle of the security policy.

Figure 3:
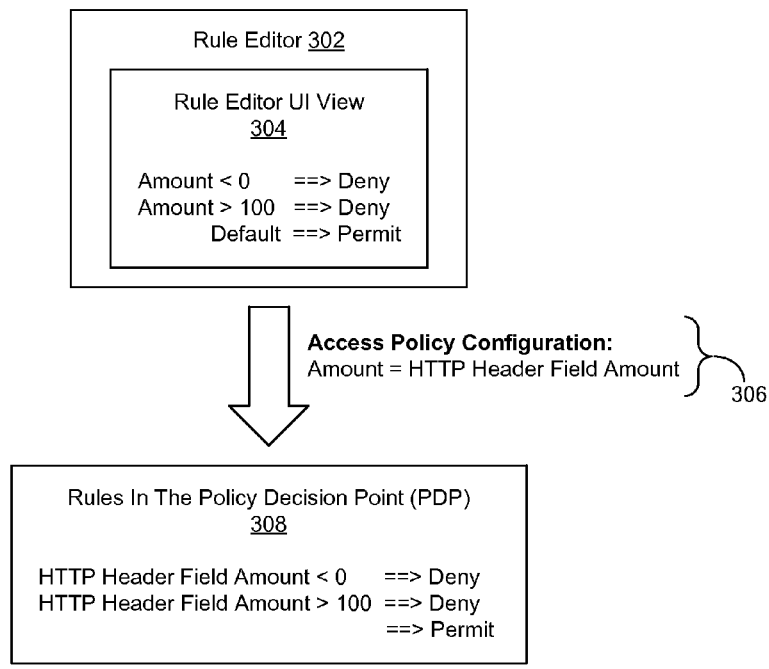
FIG. 3 is a simplified block diagram of a rules editor used to author a policy.

FIG. 3 is a simplified block diagram of a rules editor implemented in accordance with an embodiment of the invention to author a policy. In various embodiments, the rules editor 302 is included as a module of a security policy management (SPMS), described in greater detail herein. As used herein, a web form broadly refers to a structured portion of a web page that includes one or more associated parameters. In various embodiments, these web form parameters are used, as described in greater detail herein, by an SPMS to determine whether to approve, or disapprove, access requests for predetermined resources. In various embodiments, the SPMS includes an authorization engine.

Those of skill in the art are aware that current approaches to discovery of protected resources typically only return service hierarchy information associated with a target web page. For example, this service hierarchy information may include a Java Server Page's (JSP) URL, Enterprise Java Beans (EJB) methods, and Web Service Description Language (WSDL) services and methods. In various embodiments, extended information associated with protected resources is obtained from various sources to assist in the authoring of a security policy. More specifically, this extended information may include parameter information from sources such as Java Enterprise Edition (JEE) deployment descriptors, WSDL, and Hypertext Markup Language (HTML) files. Furthermore, resource parameters, such as HTTP request parameters, EJB method parameters, or WSDL method parameters can first be identified, and then used, in various embodiments of the invention to assist in authoring a security policy when forming conditions of access to a protected resource.

For example, when processing a JSP page:
scan html <form>, collect <action> url, (resource), and <input> (resource parameters)

As another example, when processing a web service:
scan .wsdl files. collect methods (resource) and method parameters (resource parameters)

As yet another example, when processing an EJB:
scan ejb-jar/web xml, collect ejb/web methods (resource), and method parameters (resource parameters)

or:
scan .Java source for annotations (JEE 5)

In these embodiments, the extended parameter information can be made available for authoring a security policy 306 once it has been identified. As an example, an administrator selects a discovered resource and then clicks a button within a user interface 304 of the rule editor 302 to create a conditional access rule 308:

"allow access if <discovered parameter> [operator] <value>"

In this example, the <discovered parameter> is made available to the administrator because it has been collected during resource discovery. In various embodiments, discovery of these parameters bypasses the need for manual input and automates the transfer of this information from the application developer to the policy administrator. In these embodiments, it will be appreciated that an HTML file would be considered a non-authoritative source as it does not necessary include all of resource parameters accepted by the resource. Likewise, deployment descriptors and WSDL files would be considered as authoritative sources as they define structure and parameters of the application.

In one embodiment, a target web page (e.g., .HTML, .JSP, etc.) is scanned to find a form containing various parameters. These parameters are then automatically provided to a rule editor 302, referencing their source URL:

```
<HTML>
<HEAD> <TITLE>Bank</TITLE> </HEAD>
<BODY>
<H2>Transfer Money</H2>
<FORM ACTION="processTransaction.jsp">
Amount: <INPUT TYPE="TEXT" ID="amt"> </BR>
From Account: <INPUT TYPE="TEXT" ID="src"> </BR>
To Account: <INPUT TYPE="TEXT" ID="dst"> </BR>
</FORM>
</BODY>
</HTML>
```

As shown above, the resource processTransaction.jsp has three different parameters: amt, src, and dst. In current known approaches, an administrator would manually configure those parameters in a rule as follows:

urn:ibm:jacc:1.0:resource:http-param:amt, urn:ibm:jacc: 1.0:resource:http-param:src and urn:ibm:jacc:1.0:resource:http-param:dst In one embodiment, a text processor that is a component of an SPMS reads the HTML code, identifies the forms and the parameters within them, and then automatically creates rule parameters 308 for the identified forms and their associated parameters. In another embodiment, the HTML code is directly made available, as part of a secured application. In yet another embodiment, the HTML code is indirectly made available by using the AppScan Standard to get dynamically generated HTML pages. In one embodiment, the rules editor 302 is configured to perform editing operations on policy rule parameters.

Figure 4:
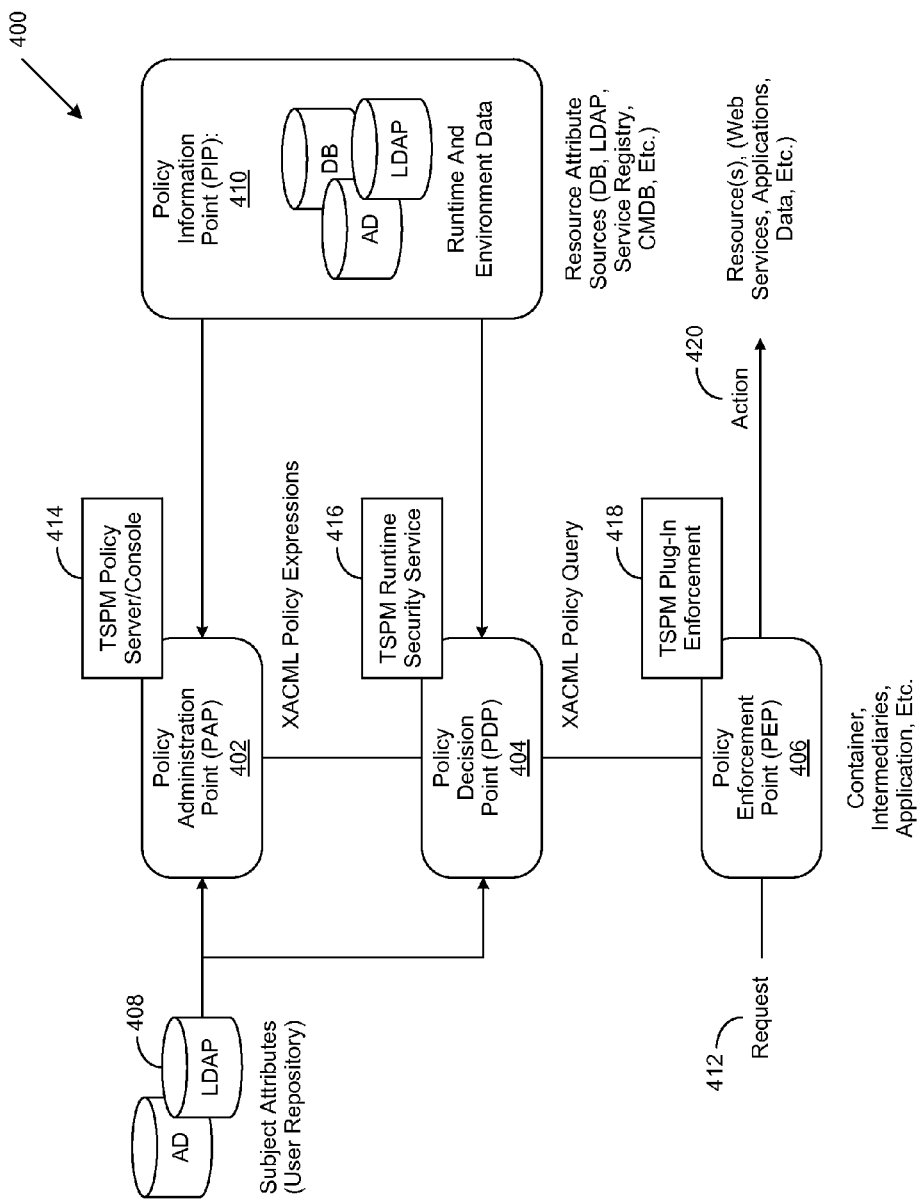
FIG. 4 is a simplified block diagram of a security policy management system.

FIG. 4 is a simplified block diagram of a security policy management system implemented in accordance with an embodiment of the invention. In various embodiments, the security policy management system (SPMS) 400 may be implemented across one or more machines operating in a computing environment, such as shown in FIG. 1. In certain embodiments, the SPMS includes an authorization engine. In this embodiment, the SPMS 400 may include a policy administration point (PAP) 402, a policy decision point (PDP) 404, and a policy enforcement point (PEP) 406. Generally, the policy administration point (PAP) 402 is used to define a policy, which may be specified as a set of eXtensible Access Control Markup Language (XACML) policy expressions. Skilled practitioners of the art will be familiar with the XACML standard, which defines a declarative access control policy language implemented in XML and a processing model describing how to evaluate access requests according to the rules defined in policies.

These policies may use subject attributes provided from a user repository 408, as well runtime and environment data received from the policy information point (PIP) 410. The policy decision point (PDP) 404 receives this information and responds to an XACML policy query received from the policy enforcement point (PEP) 406 to enforce the policy for a request 412 and with respect to a particular action 420 initiated by the request 412. In various embodiments, the request 420 may include access requests for predetermined resources. As an example, the request 420 may be an access request from a healthcare professional for a protected resource, such as a patient's electronic medical record (EMR). To further the example, the EMR may include a digitized diagnostic image, such as an x-ray. In this example, an attending physician may be granted access to the x-ray, while a nurse may not, as the rules associated with the policy may state that only the patient's attending physician has access to diagnostic images. As another example, a web form may include a field for a user to enter the amount of a monetary transfer to a recipient. In this example, the rules associated with the policy may state that the maximum amount of the monetary transfer is $10,000.00 to reduce the possibility of money laundering. To further the example, any attempt by the user to enter an amount in excess of $10,000.00 would be denied, as the policy would be enforced by the PEP 406.

In one embodiment, the PDP 404 implements the policy decision, and the PEP 406 is implemented within a predetermined authentication module, although this is not a limitation. In one commercial implementation of this approach, the PAP 402 is implemented by IBM® Tivoli® Security Policy Manager (TSPM) policy service/console 414, the PDP 404 is implemented in the TSPM runtime security service 416, and the PEP is implemented as a TSPM plug-in 418 to an application server, such as the IBM WebSphere® Application Server. In various commercial implementations of this approach, the PAP 402 may be an IBM® Security Access Manager Local Management interface, the PDP 404 may be an IBM® Security Access Manager for Mobile, and the PEP 406 may be an IBM® Security Access Manager for Web, or any combination thereof.

The functionality described above may be implemented as a standalone approach (e.g., as a software-based function executed by a processor), or it may be available as a managed service (e.g., as a web service via a SOAP/XML interface). The particular hardware and software implementation details described herein are merely for illustrative purposes and are not meant to limit the spirit, scope or intent of the invention. More generally, computing devices implemented in accordance with various embodiments of the invention may include one or more data processing systems, implemented to communicate with one another over a network, such as the Internet, an intranet, an extranet, a private network, or any other communications medium or link. In these embodiments, the data processing system(s) may support Web and other known services and protocols including HTTP, FTP, SMTP, SOAP, XML, WSDL, UDDI, and WSFL, among others.

Various embodiments of the invention may be implemented in, or in conjunction with, various server-side architectures including simple n-tier architectures, web portals, federated systems, and the like, as well as in a loosely-coupled server, including a cloud-based environment. Still more generally, various embodiments of the invention may be implemented as an entirely hardware embodiment, an entirely software embodiment, or an embodiment containing both hardware and software elements. In a preferred embodiment, the function is implemented in software, which includes but is not limited to firmware, resident software, microcode, and the like.

Figure 5:
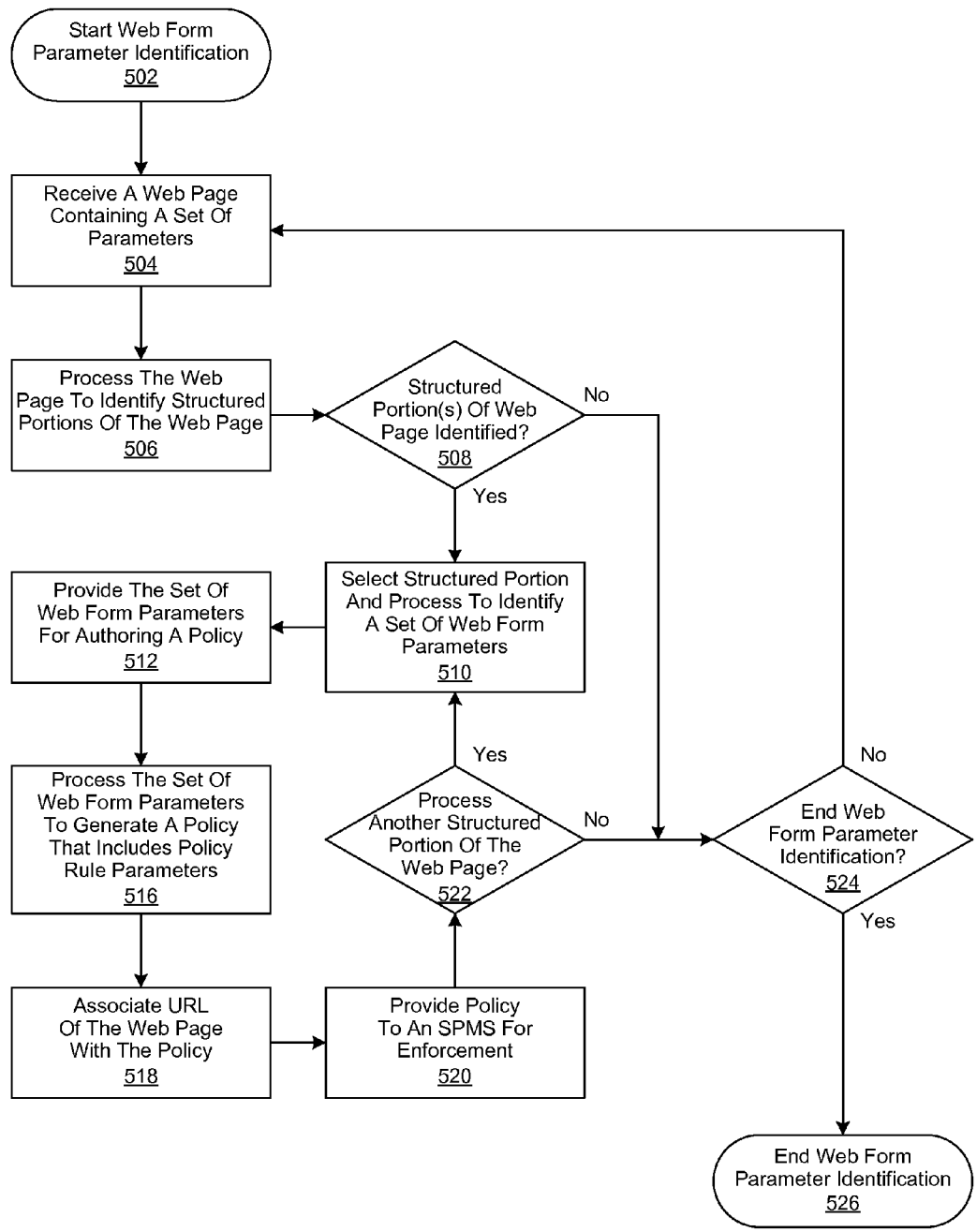
FIG. 5 is a generalized flow chart of the performance of automated web form parameter identification operations.

FIG. 5 is a generalized flow chart of automated web form parameter identification operations performed in accordance with an embodiment of the invention. In this embodiment, automated web form parameter identification operations are begun in step 502, followed by receiving a web page containing a set of parameters in step 504. The web page is then processed in step 506 to identify structured portions of the web page. In various embodiments, the structured portion of a web page is a web form. A determination is then made in step 508 whether one or more structured portions have been identified. If not, then a determination is made in step 524 whether to end automated web form parameter identification operations. If not, then the process is continued, proceeding with step 504. Otherwise, automated web form parameter identification operations are ended in step 526.

However, if one or more structured portions of the web page have been identified in step 508, then a structured portion of the web page is selected, and then processed, in step 510 to identify a corresponding set of web form parameters. Once identified, the set of web form parameters are provided for authoring a policy in step 512. In various embodiments, the web form parameters are provided to a security policy management system (SPMS) for authoring. In certain embodiments, the SPMS includes a rules editor, which is used to author a policy as described in greater detail herein.

The set of web form parameters are then processed in step 516 to generate a policy with a corresponding set of policy rule parameters. In one embodiment, the policy is an access policy, as described in greater detail herein, which is in turn used by an SPMS to determine whether to approve, or disapprove, access requests for predetermined resources. As an example, processTransaction.jsp/amt may be a term used in the authoring system of the SPMS, which in turn is implemented as urn:ibm:jacc:1.0:resource:http-param:amt in the policy decision point (PDP).

The policy generated in step 516 is then associated with its associated web page URL in step 518 and provided to a target SPMS in step 520 for enforcement. A determination is then made in step 522 whether to process another structured portion of the web page. If so, then the process is continued, proceeding with step 510. If not, then a determination is made in step 524 whether to end automated web form parameter identification operations. If not, then the process is continued, proceeding with step 504. Otherwise, automated web form parameter identification operations are ended in step 526.

Although the present invention has been described in detail, it should be understood that various changes, substitutions and alterations can be made hereto without departing from the spirit and scope of the invention as defined by the appended claims.

What is claimed is:

1. A computer-implemented method for automating the identification of web form parameters for an authorization engine, comprising:
receiving a web page comprising a set of parameters;
processing the web page to identify a first structured portion of the web page;
performing parsing operations to identify a first set of structured portion parameters associated with the first structured portion of the web page;
processing the first set of structured portion parameters to generate a first policy comprising the first set of policy rule parameters, the first policy comprising an access policy;
providing the set of parameters to an authorization engine, the access policy being used by the authorization engine to approve access requests for resources;
associating a universal resource locator (URL) with the first policy, the URL corresponding to the web page;
processing a second set of structured portion parameters corresponding to the second structured portion of the web page to generate a second policy, the second policy comprising a second set of policy rule parameters; and wherein
the authorization engine comprises a rules editor configured to perform editing operations on the first set of policy rule parameters.

2. The method of claim 1, further comprising:
receiving user input data comprising a first set of policy rule parameters.

3. A system comprising:
a processor;
a data bus coupled to the processor; and
a computer-usable medium embodying computer program code, the computer-usable medium being coupled to the data bus, the computer program code used for automating the identification of web form parameters for an authorization engine and comprising instructions executable by the processor and configured for:
receiving a web page comprising a set of parameters;
processing the web page to identify a first structured portion of the web page;
performing parsing operations to identify a first set of structured portion parameters associated with the first structured portion of the web page;
processing the first set of structured portion parameters to generate a first policy comprising the first set of policy rule parameters, the first policy comprising an access policy; and
providing the set of parameters to an authorization engine, the access policy being used by the authorization engine to approve access requests for resources;
associating a universal resource locator (URL) with the first policy, the URL corresponding to the web page;
processing a second set of structured portion parameters corresponding to the second structured portion of the web page to generate a second policy, the second policy comprising a second set of policy rule parameters; and wherein
the authorization engine comprises a rules editor configured to perform editing operations on the first set of policy rule parameters.

4. The system of claim 3, further comprising:
receiving user input data comprising a first set of policy rule parameters.

5. A non-transitory, computer-readable storage medium embodying computer program code, the computer program code comprising computer executable instructions configured for:
receiving a web page comprising a set of parameters;
processing the web page to identify a first structured portion of the web page;

performing parsing operations to identify a first set of structured portion parameters associated with the first structured portion of the web page;

processing the first set of structured portion parameters to generate a first policy comprising the first set of policy rule parameters, the first policy comprising an access policy; and providing the set of parameters to an authorization engine, the access policy being used by the authorization engine to approve access requests for resources;

associating a universal resource locator (URL) with the first policy, the URL corresponding to the web page;

processing a second set of structured portion parameters corresponding to a second structured portion of the web page to generate a second policy, the second policy comprising a second set of policy rule parameters; and wherein the authorization engine comprises a rules editor configured to perform editing operations on the first set of policy rule parameters.

6. The non-transitory, computer-readable storage medium of claim 5, further comprising:

receiving user input data comprising a first set of policy rule parameters.

7. The non-transitory, computer-readable storage medium of claim 5, wherein the computer executable instructions are deployable to a client system from a server system at a remote location.

8. The non-transitory, computer-readable storage medium of claim 5, wherein the computer executable instructions are provided by a service provider to a user on an on-demand basis.

* * * * *